United States Patent [19]

Kuznicki et al.

[11] Patent Number: 5,423,057
[45] Date of Patent: Jun. 6, 1995

[54] METHOD AND APPARATUS FOR SHARING SIGNALING FORMATS IN A COMMUNICATION CHANNEL

[75] Inventors: William J. Kuznicki, Coral Springs; Robert J. Schwendeman, Pompano Beach, both of Fla.

[73] Assignee: Motorola, Inc., Schaumburg, Ill.

[21] Appl. No.: 130,248

[22] Filed: Oct. 1, 1993

[51] Int. Cl.$^6$ .............................................. H04Q 7/00
[52] U.S. Cl. .................................. 455/38.3; 455/343; 340/825.47
[58] Field of Search ...................... 455/38.1, 38.3, 54.1, 455/56.1, 343; 340/311.1, 825.44, 825.47; 370/95.1, 95.3, 110.1

[56] References Cited

U.S. PATENT DOCUMENTS

| | | |
|---|---|---|
| 4,398,192 | 8/1983 | Moore et al. |
| 4,449,248 | 5/1984 | Leslie et al. ........................ 455/38.3 |
| 4,668,949 | 5/1987 | Akahori et al. |
| 4,860,003 | 8/1989 | DeLuca et al. |
| 4,897,835 | 1/1990 | Gaskill et al. |
| 5,128,665 | 7/1992 | DeLuca et al. |
| 5,168,493 | 12/1992 | Nelson et al. |
| 5,260,700 | 11/1993 | Merchant et al. ................ 455/51.1 |

OTHER PUBLICATIONS

PCT Publication WO 91/10304, published Jul. 11, 1991, by DeLuca, entitled "Synchronous Selective Signalling System".

"Semi-Distributed Addressing, a New Concept for ERMES Radio Protocol," dated May 11, 1989, by an unknown author.

"Sub-addressing, a Battery Saving Method," dated Mar. 16, 1989, by an unknown author.

"FLEX TM System Management Documentation," Issue 1.1, published Aug. 5, 1993, by Motorola, Inc., U.S.A.

Primary Examiner—Reinhard J. Eisenzopf
Assistant Examiner—Thanh Le
Attorney, Agent, or Firm—R. Louis Breeden

[57] ABSTRACT

A method and apparatus allows sharing first and second signaling formats (400, 708) in a communication system. The first signaling format (400) is synchronous and includes frames (401) transmitted in predetermined frame positions (402). Receivers (110) utilizing the first signaling format (400) are preprogrammed with a base frame position (324) corresponding to one of the predetermined frame positions (402). A system value (326) is transmitted (508) and stored (612) in the receivers (110) for enabling the receivers (110) to monitor (620) at least one frame position (402). The at least one monitored frame position (402) is determined from the preprogrammed base frame position (324) and the system value (326). Frames (401) of the first signaling format (400) are transmitted (508) periodically, and the second signaling format (708) is sent between the periodic transmissions of the first signaling format (400).

15 Claims, 5 Drawing Sheets

METHOD AND APPARATUS FOR SHARING SIGNALING FORMATS IN A COMMUNICATION CHANNEL

FIELD OF THE INVENTION

This invention relates in general to radio communication systems, and more specifically to a method and apparatus for sharing a communication channel in a selective call communication system.

BACKGROUND OF THE INVENTION

Selective call communication systems that transmit two or more signaling formats on a single communication channel are well known in the communications art. Asynchronous formats, such as two-tone and five-tone sequential signaling, and short-term-synchronous formats, such as the Post Office Code Standardization Advisory Group (POCSAG) and Golay Sequential Code (GSC) selective call signaling, have been combined on common communication channels for many years.

Conventional POCSAG and GSC signaling formats require the transmission of a synchronization signal, or "preamble," necessary for battery saving circuits in receivers operating in the system, and for synchronizing the receivers prior to the transmission of user information. Systems utilizing these formats typically send pages in batches, a batch being transmitted in response to either a predetermined number of pages having been queued for output, or a time limit for delaying queued pages having been reached, whichever condition is satisfied first. The batches thus can be sent at random times that are traffic dependent.

Long-term-synchronous signaling formats, such as the signaling format disclosed in PCT Publication No. WO 91/10304, by Michael J. DeLuca, published Jul. 11, 1991, are now emerging. Such formats transmit information in "frames" that occupy predetermined, cyclic positions in time. Selective call receivers operating with these formats are assigned to monitor specific ones of the frame positions for battery saving purposes. During time intervals corresponding to frame positions not assigned to a receiver, the receiver "sleeps" in a low-power mode to conserve battery power. Long-term-synchronous signaling formats can provide very long, e.g., four-minute, battery saving cycles when required for superior receiver battery life.

A problem can occur when one attempts to mix a short-term-synchronous signaling format and a long-term-synchronous signaling format on a common channel. The problem can occur, for example, if separate, interlocked encoders are used on the common channel, and the short-term-synchronous encoder is transmitting on the common channel at a time when an assigned frame position of the long-term-synchronous format arrives. Such undesirable interaction can cause missed or severely delayed pages in the system utilizing the long-term-synchronous format.

Thus, what is needed is a method and apparatus for sharing a long-term-synchronous signaling format and a short-term-synchronous signaling format on a common communication channel without producing undesirable interaction between the two formats. A method and apparatus is needed that will allow an existing communication system to make a graceful transition from a short-term-synchronous format to the more modern, long-term-synchronous format, while preferably allowing immediate exploitation of the superior battery saving characteristics of the long-term-synchronous format.

SUMMARY OF THE INVENTION

An aspect of the present invention is a method of sharing first and second signaling formats on a communication channel in a communication system comprising a system controller and first and second pluralities of selective call receivers communicating in the first and second signaling formats, respectively. The first signaling format is synchronous and comprises frames transmitted no less frequently than a minimum frame rate in selected ones of a plurality of predetermined frame positions. Each of the first plurality of selective call receivers is preprogrammed with a base frame position corresponding to one of the plurality of predetermined frame positions. The method comprises under control of the system controller the step of programming a system value stored in the first plurality of selective call receivers for defining a system battery saving interval. The programmed system value is for enabling the first plurality of selective call receivers to receive communications transmitted in at least one position of the plurality of predetermined frame positions. The at least one position is determined from the preprogrammed base frame position and the system value. The method further comprises the steps of transmitting frames of the first signaling format utilizing at least the minimum frame rate, each transmission having a beginning and an end, and sending frames of the second signaling format during time intervals between the end of a transmission of the first signaling format and the beginning of a next transmission of the first signaling format. The system value comprises a system integer S, and the programming step comprises the step of controlling the system integer S for enabling the first plurality of selective call receivers to receive communications transmitted in any frame position selected from the base frame position and frame positions $N \times 2^S$ frame positions away from the base frame position, where N is any integer.

Another aspect of the present invention is a system controller for controlling sharing of first and second signaling formats on a communication channel in a communication system comprising the system controller and first and second pluralities of selective call receivers communicating in the first and second signaling formats, respectively. The first signaling format is synchronous and comprises flames transmitted no less frequently than a minimum frame rate in selected ones of a plurality of predetermined frame positions. Each of the first plurality of selective call receivers is preprogrammed with a base frame position corresponding to one of the plurality of predetermined frame positions. The system controller comprises a page input for receiving page requests from callers desiring to send messages to one of the first and second pluralities of selective call receivers, and a page queue coupled to the page input for storing selective call addresses and messages corresponding to the received page requests for subsequent transmission. The system controller further comprises a processor coupled to the page queue for controlling an encoder/transmitter controller to generate a transmission of frames of the first signaling format utilizing at least the minimum frame rate, the frames comprising the selective call addresses and messages stored in the page queue, and each transmission having a beginning and an end. The system controller also includes the encoder/transmitter controller coupled to the processor for generating the transmission of frames of the first signaling format, and a programmer coupled to the processor for programming a system value stored in the first plurality of selective call receivers for defining a system battery saving interval. The programmed system value is for enabling the first plurality of selective call receivers to receive communications transmitted in at least one position of the plurality of predetermined frame positions, the at least one position determined from the preprogrammed base frame position and the system value. In addition, the system controller includes an injector coupled to the processor for controlling the encoder/transmitter controller to send frames of the second signaling format during time intervals between the end of a transmission of the first signaling format and the beginning of a next transmission of the first signaling format. The system value comprises a system integer S, and the programmer comprises a frame controller for controlling the system integer S for enabling the first plurality of selective call receivers to receive communications transmitted in any frame position selected from the base frame position and frame positions $N \times 2^S$ frame positions away from the base frame position, where N is any integer. The programmer further comprises an encoder controller coupled to the frame controller for directing the processor to encode $2^S$ frames per transmission. Another aspect of the present invention is a selective call receiver operating on a first signaling format for sharing a communication channel with a plurality of selective call receivers operating on a second signaling format in a communication system comprising a system controller. The first signaling format is synchronous and comprises frames transmitted no less frequently than a minimum frame rate in selected ones of a plurality of predetermined frame positions. The selective call receiver comprises an antenna for intercepting radio signals comprising addresses, messages, and control commands, and a receiver element coupled to the antenna for demodulating the intercepted radio signals to derive the addresses, messages, and control commands. The selective call receiver further comprises a decoder coupled to the receiver element for decoding the addresses, and a controller responsive to the decoder and coupled to the receiver element for processing the messages and control commands. The selective call receiver also includes a first memory element coupled to the controller for storing a preprogrammed base frame position corresponding to one of the plurality of predetermined frame positions, and a second memory element coupled to the controller for storing a system value received in the control commands. The system value defines a system battery saving interval for enabling the selective call receiver to receive communications transmitted in at least one position of the plurality of predetermined frame positions, the at least one position determined from the preprogrammed base frame position and the system value. In addition, the selective call receiver includes a synchronizer coupled to the first and second memory elements and coupled to the controller for controlling the selective call receiver to receive frames of the first signaling format transmitted in the at least one position utilizing at least the minimum frame rate, each transmission having a beginning and an end, and an ignore element coupled to the synchronizer for controlling the selective call receiver to ignore transmissions sent in the second signaling format during time intervals between the end of a transmission of the first signaling format and the beginning of a next transmission of the first signaling format. The system value comprises a system integer S, and the selective call receiver further comprises a frame monitor for enabling the selective call receiver to receive communications transmitted in any frame position selected from the preprogrammed base frame position and frame positions $N \times 2^S$ frame positions away from the preprogrammed base frame position, where N is any integer.

DESCRIPTION OF THE PREFERRED EMBODIMENT

Figure 1:
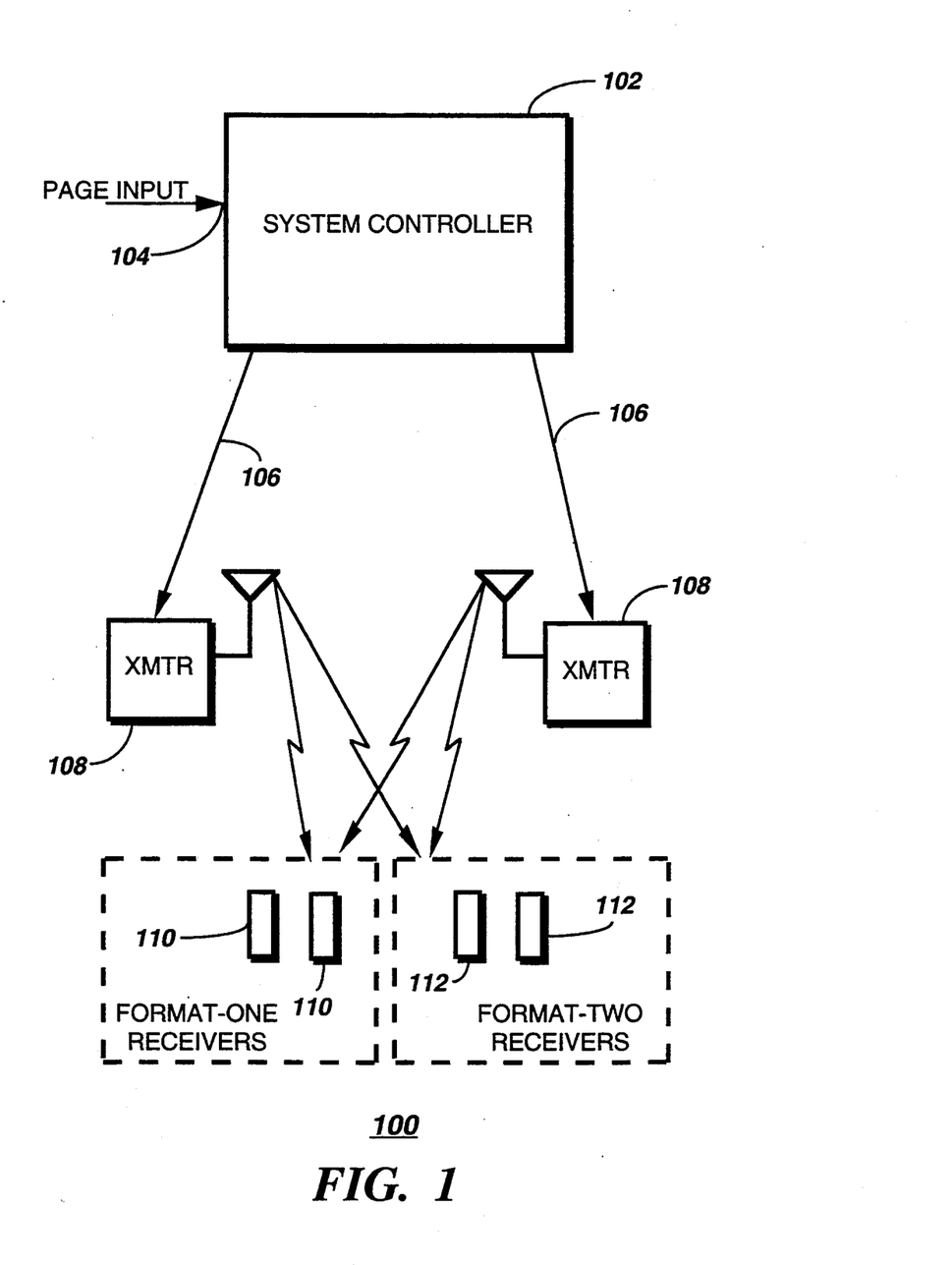
FIG. 1 is an electrical block diagram of a communication system in accordance with the preferred embodiment of the present invention.

Referring to FIG. 1, a system block diagram of a communication system 100 in accordance with the preferred embodiment of the present invention comprises a system controlled 102 for formatting and queuing selective call messages and controlling the transmission thereof. The system controller 102 comprises a page input 104 for receiving calls directed to individual selective call receiver addresses in a manner well known in the art. The system controller 102 is coupled by at least one telephone line 106 to at least one transmitter 108 for transmitting the selective call messages by radio communications to first and second pluralities of selective call receivers 110, 112 communicating in first and second signaling formats, respectively. Preferably, the system controller 102 is similar to a model EO9-PEDO552 PageBridge® paging terminal, the paging transmitter is similar to a model C73 PURC 5000® transmitter, and the first and second pluralities of selective call receivers 110, 112 are similar to a model AO3KLB5962CA ADVISOR® pager, all manufactured by Motorola, Inc. of Schaumburg, Illinois. It will be appreciated that other similar equipment may be used as well to construct the communication system 100.

During operation, the system controller 102 receives and queues page requests from callers desiring to send messages to ones of the first and second pluralities of selective call receivers 110, 112. Periodically, e.g., every minute, the system controller 102 controls the transmitters 108 to transmit the queued pages to the selective call receivers 110, 112. The first signaling format utilized by the first plurality of selective call receivers 110 preferably is long-term-synchronous and comprises frames transmitted no less frequently than a minimum frame rate in selected ones of a plurality of predetermined frame positions. Each of the first plurality of selective call receivers 110 preferably is preprogrammed with a base frame position 324 (FIG. 3) corresponding to one of the plurality of predetermined flame positions. It will be appreciated that the base flame position 324 can be defined inherently by the address of the selective call receiver 110, as well.

Figure 3:
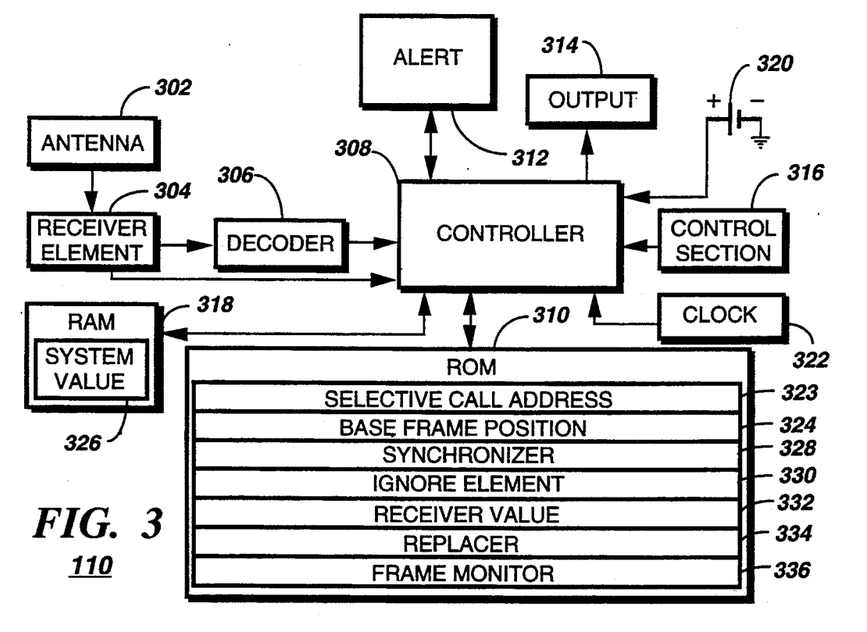
FIG. 3 is an electrical block diagram of a selective call receiver in accordance with the preferred embodiment of the present invention.

Each selective call receiver 110 receives information during the frame corresponding to the base frame position 324 preprogrammed therein and can be further programmed to receive information in additional flames related to the base frame position 324, as described herein below. Long-term-synchronous signaling systems preferable for the first plurality of selective call receivers 110 are disclosed in U.S. Pat. No. 5,128,665, granted Jul. 7, 1992, to DeLuca et al. and in U.S. Pat. No. 5,168,493, granted Dec. 1, 1992, to Nelson et al. Said U.S. Patents are hereby incorporated herein by reference.

The second signaling format utilized by the second plurality of selective call receivers 112 preferably is a conventional short-term-synchronous format and comprises batches of pages sent following a synchronization preamble. Short-term-synchronous signaling is typical of the aforementioned well-known POCSAG and GSC signaling formats in widespread use today, which are expected to be replaced over the next few years by long-term-synchronous formats. The communication system 100 in accordance with the preferred embodiment of the present invention advantageously allows sharing of the long-term .format and the short-term format on a communication channel, substantially without degrading the performance of either format, as will be described herein below.

Figure 2:
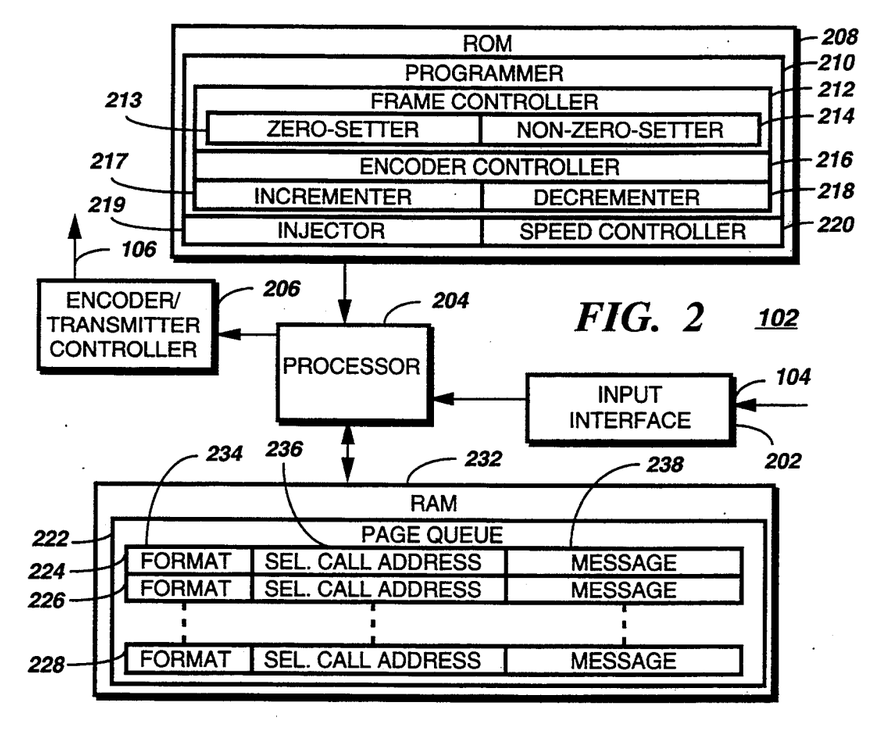
FIG. 2 is an electrical block diagram of a system controller in accordance with the preferred embodiment of the present invention.

Referring to FIG. 2, an electrical block diagram of the system controller 102 in accordance with the preferred embodiment of the present invention comprises an input interface 202 for accepting page requests from the page input 104. The system controller 102 further comprises a processor 204 coupled to the input interface for processing the accepted page requests and queuing selective call addresses and messages corresponding thereto. The processor 204 is coupled to a random access memory (RAM) 232 for storing a page queue 222 comprising pages 224, 226, 228 corresponding to received page requests. Preferably, each of the pages 224, 226, 228 includes a format identifier 234 for identifying the signaling format to be utilized for the page, along with a selective call address 236 and a message 238. It will be appreciated that, in the alternative, a separate page queue can be utilized for each of the signaling formats, as well, thus obviating the format identifier 234 for each of the pages 224, 226, 228.

The processor 204 controls the transmission of frames of the first signaling format utilizing at least a minimum frame rate required for maintaining synchronization, the frames comprising the selective call addresses 236 and messages 238 stored in the page queue 222. The processor 204 is also coupled to a read-only memory (ROM) 208 for non-volatile storage of firmware elements for directing the system controller 102 in accordance with the preferred embodiment of the present invention. It will be appreciated that other forms of non-volatile memory, such as programmable read-only memory (PROM), electrically erasable programmable read-only memory (EEPROM), electrically alterable read-only memory (EAROM), and magnetic disk memory, can be utilized as well for the ROM 208.

The firmware elements comprise a programmer 210 for programming a system value 326 (FIG. 3), comprising a system integer S, to be stored in the first plurality of selective call receivers 110 for defining a system battery saving interval. The programmed system value 326 enables the first plurality of selective call receivers 110 to receive communications transmitted in at least one position of the plurality of predetermined frame positions. The at least one position is determined from a preprogrammed base frame position 324 (FIG. 3) and the system value 326, in a manner that will be described herein below.

The firmware elements further comprise an injector 219 for sending the second signaling format, i.e., the short-term-synchronous signaling format, to the second plurality of selective call receivers 112 during time intervals between the end of a transmission of the long-term-synchronous signaling format and the beginning of a next transmission of the long-term-synchronous signaling format. The firmware elements also include a speed controller 220 for directing the processor 204 to send the frames of the long-term-synchronous signaling format at a frame rate faster than the minimum frame rate required for maintaining synchronization in response to increasing communication traffic. The frame rate is increased when necessary to handle more communication traffic than can be handled at the minimum frame rate.

The programmer 210 comprises a frame controller 212 for controlling the system integer S for enabling the first plurality of selective call receivers 110 to receive communications transmitted in any frame position selected from the base frame position 324 and frame positions $N \times 2^S$ frame positions away from the base frame position 324, where N is any integer. The frame controller 212 comprises a zero-setter 213 for setting the system integer S to zero for enabling the plurality of selective call receivers 110 to receive communications transmitted in every possible frame position of the long-term-synchronous signaling format. The frame controller 212 further comprises a non-zero-setter 214 for setting the system integer S to a value greater than zero to enable the plurality of selective call receivers 110 to receive communications transmitted in less than every possible frame position of the long-term-synchronous signaling format.

The programmer 210 further comprises an encoder controller 216 for directing the processor 204 to encode $2^S$ frames per transmission of the long-term-synchronous signaling format, where S is the system integer. The programmer 210 further comprises an incrementer 217 coupled to the speed controller 220 for incrementing the system integer S by a count of one in response to the speed controller 220 directing the processor 204 to send the frames of the long-term-synchronous signaling format at a rate faster than twice the minimum frame rate. The programmer 210 also includes a decrementer 218 for decrementing the system integer S by a count of one in response to average traffic per frame being less than fifty percent of frame capacity at the minimum frame rate, when the system integer S is greater than zero.

The processor 204 is also coupled to an encoder/transmitter controller 206 for interfacing with the transmitter 108 over one of the telephone lines 106 for transmitting pages and messages to the selective call receivers 110, 112. The hardware elements of the system controller 102 are conventional and preferably are similar to the hardware elements of the model EO9PEDO552 PageBridge ® paging terminal manufactured by Motorola, Inc. of Schaumburg, Illinois. The firmware elements 210, 212, 213, 214, 216, 217, 218, 219, 220, and the organization and utilization of the RAM 232 within the system controller 102 comprise new elements in accordance with the preferred embodiment of the present invention.

Referring to FIG. 3, an electrical block diagram of the selective call receiver 110 in accordance with the preferred embodiment of the present invention comprises an antenna 302 for intercepting RF signals. The antenna 302 is coupled to a receiver element 304 for receiving and demodulating the RF signals intercepted. A decoder 306 is coupled to the receiver element 304 for decoding a demodulated address, preferably transmitted in the long-term-synchronous signaling format described in U.S. Pat. Nos. 5,128,665 and 5,168,493 previously incorporated herein by reference. A controller 308, e.g., the MC68HCO5, CO8, or C11 series microcomputers manufactured by Motorola, Inc. of Schaumburg, IL, is also coupled to the receiver element 304 for processing the demodulated information. The controller 308 is responsive to the decoder 306 and is coupled to a random access memory (RAM) 318 for storing operating variables and recovered information having an address assigned to the selective call receiver 110. The RAM 318 also stores received control information, such as the system value 326. An alert generator 312 is coupled to the controller 308 for providing an audible or tactile alert to a user when the controller 308 has a received message ready for presentation.

An output device 314 comprises a visual display or an audio transducer or both, the output device 314 also being controlled by the controller 308. A control section 316 comprises user accessible controls for allowing the user to command the controller 308 to perform the selective call receiver operations well known to one of ordinary skill in the art, and typically includes control switches such as an on/off control button, a function control, etc. A conventional clock element 322 is coupled to the controller 308 for providing timing signals thereto, while a battery 320 is also coupled to the controller 308 for providing power to the controller 308 and to other elements of the selective call receiver 110.

The controller 308 is also coupled to a read-only memory (ROM) 310 comprising firmware elements for controlling the selective call receiver 110 in accordance with the preferred embodiment of the present invention. The firmware elements comprise a value for a selective call address 323 to which the selective call receiver 110 is responsive. The firmware elements further comprise a value for the base frame position 324 corresponding to an assigned one of the plurality of predetermined frame positions. It will be appreciated that, alternatively, the base frame position 324 may be defined to be an inherent part of the selective call address 323, as well.

The firmware elements also include a synchronizer 328 for controlling the selective call receiver 110 to receive selected frames of the first signaling format transmitted in the long-term-synchronous signaling format in at least one frame position utilizing at least the minimum frame rate. In addition, the firmware elements include an ignore element 330 coupled to the synchronizer 328 for controlling the selective call receiver 110 to ignore transmissions not sent in the long-term-synchronous signaling format during time intervals between the end of a transmission of the long-term-synchronous signaling format and the beginning of a next transmission of the long-term-synchronous signaling format.

The firmware elements further comprise a location for storing a receiver value 332 preprogrammed for defining a receiver maximum battery saving interval for the selective call receiver 110, and a replacer 334 for internally replacing the system value 326 by the receiver value 332 in response to the system value 326 defining a system battery saving interval larger than the receiver maximum battery saving interval. The firmware elements also include a frame monitor 336 for enabling the selective call receiver 110 to receive communications transmitted in any frame position selected from the base frame position 324 and frame positions $N \times 2^S$ frame positions away from the base frame position 324. In the preceding formula, N is any integer and S is the system integer S, received from the system controller 102 and stored as the system value 326.

It will be appreciated that the functions of the decoder 306, the RAM 318, and the ROM 310 may be incorporated into the controller 308 as well, as contiguous components thereof. It will be further appreciated that other types of non-volatile memory, e.g., programmable read-only memory (PROM), electrically alterable read-only memory (EAROM), and electrically-erasable programmable read-only memory (EEPROM), may be used as well for the ROM 310.

Figure 4:
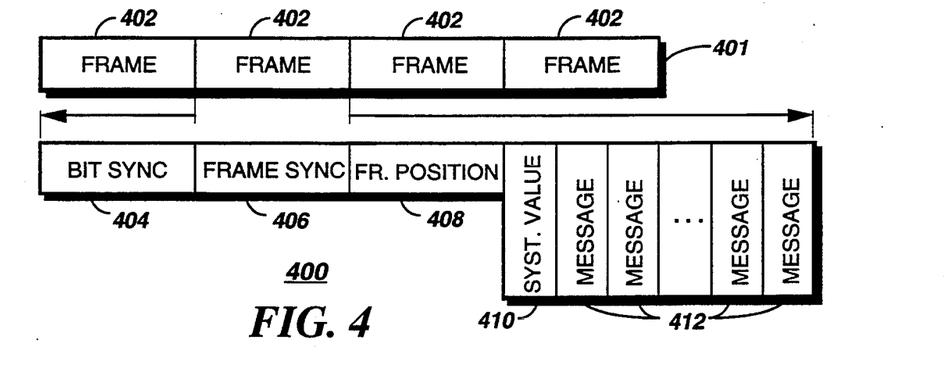
FIG. 4 is a signaling diagram depicting a signaling format in accordance with the preferred embodiment of the present invention.

Referring to FIG. 4, a signaling diagram depicts a first signaling format 400 utilized by the communication system 100 for the first plurality of selective call receivers 110 in accordance with the preferred embodiment of the present invention. The first signaling format 400 preferably is a long-term-synchronous format having a plurality of frames 401 transmitted in a plurality of frame positions 402. Each of the frames 401 comprises a bit sync field 404 for providing bit synchronization to the selective call receiver 110, and a frame sync field 406 for providing frame synchronization. Each of the flames 401 further comprises a frame position field 408 for identifying the frame position 402, and a system value field 410 for containing the system value 326. The remainder of each of the frames 401 comprise messages 412, including selective call addresses for identifying intended recipients of the messages.

Figure 5:
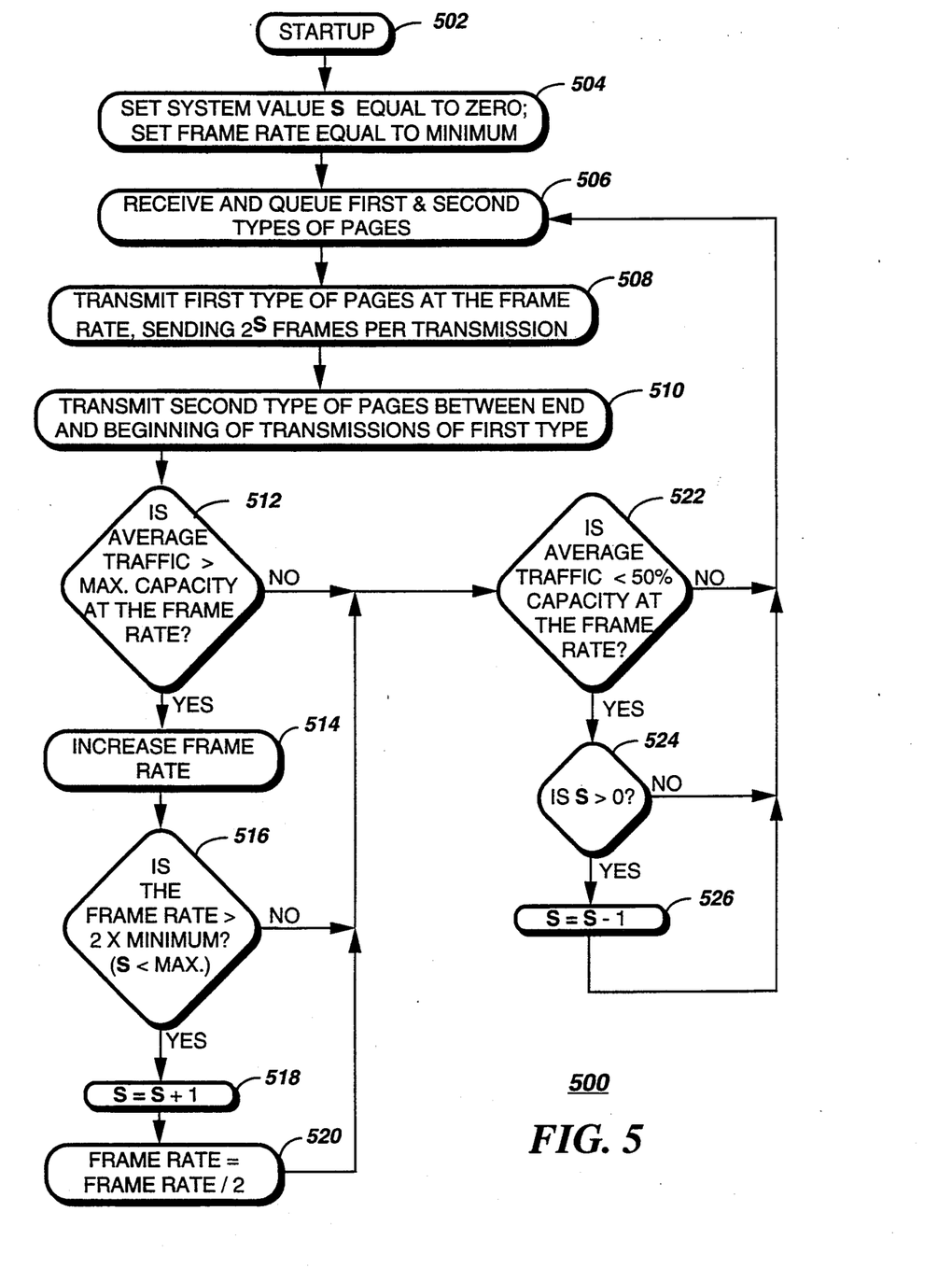
FIG. 5 is a flow chart depicting operation of the system controller in accordance with the preferred embodiment of the present invention.

Referring to FIG. 5, a flow chart 500 depicting operation of the system controller 102 in accordance with the preferred embodiment of the present invention begins with system startup 502. In response to startup, the processor 204 accesses the speed controller 220 and the zero setter 213, and sets 504 the system value S equal to zero and the frame rate equal to the minimum required for maintaining synchronization of the selective call receivers 110. It will be appreciated that in systems in which there are a large number of the selective call receivers, it can be preferable to set the system value S to a value larger than zero in response to startup, as will become more clear from reading the operational description of the preferred embodiment of the present invention herein below.

Next, the processor 204 controls the selective call receiver 110 to receive and queue 506 in the page queue 222 first and second types of pages for the first and second pluralities of selective call receivers 110, 112. The processor 204 then accesses the encoder controller 216 and controls the encoder/transmitter controller 206 to transmit 508 the first type, i.e., first formal of pages at the set frame rate by sending 2S frames per transmission. For example, if S=0 and the minimum frame rate is one frame per minute, then a single frame of the first format is transmitted every minute. During the time intervals between the end of each transmission of frames of the first format and the beginning of the next transmission of the first format, the processor 204 accesses the injector 219 to control the encoder/transmitter controller 206 to transmit 510 queued pages of the second type in the second format.

Periodically, the processor 204 checks 512 whether the average type one traffic is greater than the maximum traffic capacity possible at the set frame rate. If so, the processor 204 increases 514 the frame rate, consistent with all transmission rules of the first signaling format. For example, in the preferred first signaling format a transmission may be started $N \times 2^S$ frame positions earlier than it would normally be started utilizing the currently set frame rate, where N is a positive integer that must be less than the total number of frame positions in the time interval between transmissions at the currently set frame rate, divided by $2^S$.

Next, the processor 204 checks 516 whether the frame rate has become larger than twice the minimum frame rate, while S is less than a maximum possible value predetermined for the communication system 100. If so, the processor 204 accesses the incrementer 217 to increment 518 S by one, thereby doubling the number of frames transmitted per transmission. Then the processor 204 accesses the speed controller 220 to set 520 the frame rate equal to one-half the current frame rate. Flow then proceeds to step 522, where the processor 204 checks whether the average type one traffic has fallen to less than fifty percent of the capacity possible at the currently set frame rate. If so, the processor 204 accesses the decrementer 218 and checks 524 whether S is greater than zero. If so, the processor 204 decrements 526 S by one, and flow returns to step 506 to process more pages.

If, on the other hand, in step 512 the processor 204 determines that the average type one traffic is not greater than the maximum traffic capacity possible at the set frame rate, then the flow moves directly to step 522. Also, in step 516 if the processor 204 determines that the frame rate has not become larger than twice the minimum frame rate, or that S is at a maximum possible value predetermined for the communication system 100, then the flow moves directly to step 522. Additionally, in step 524 if the processor 204 determines that S is not greater than zero, then the flow moves directly to step 506.

Figure 6:
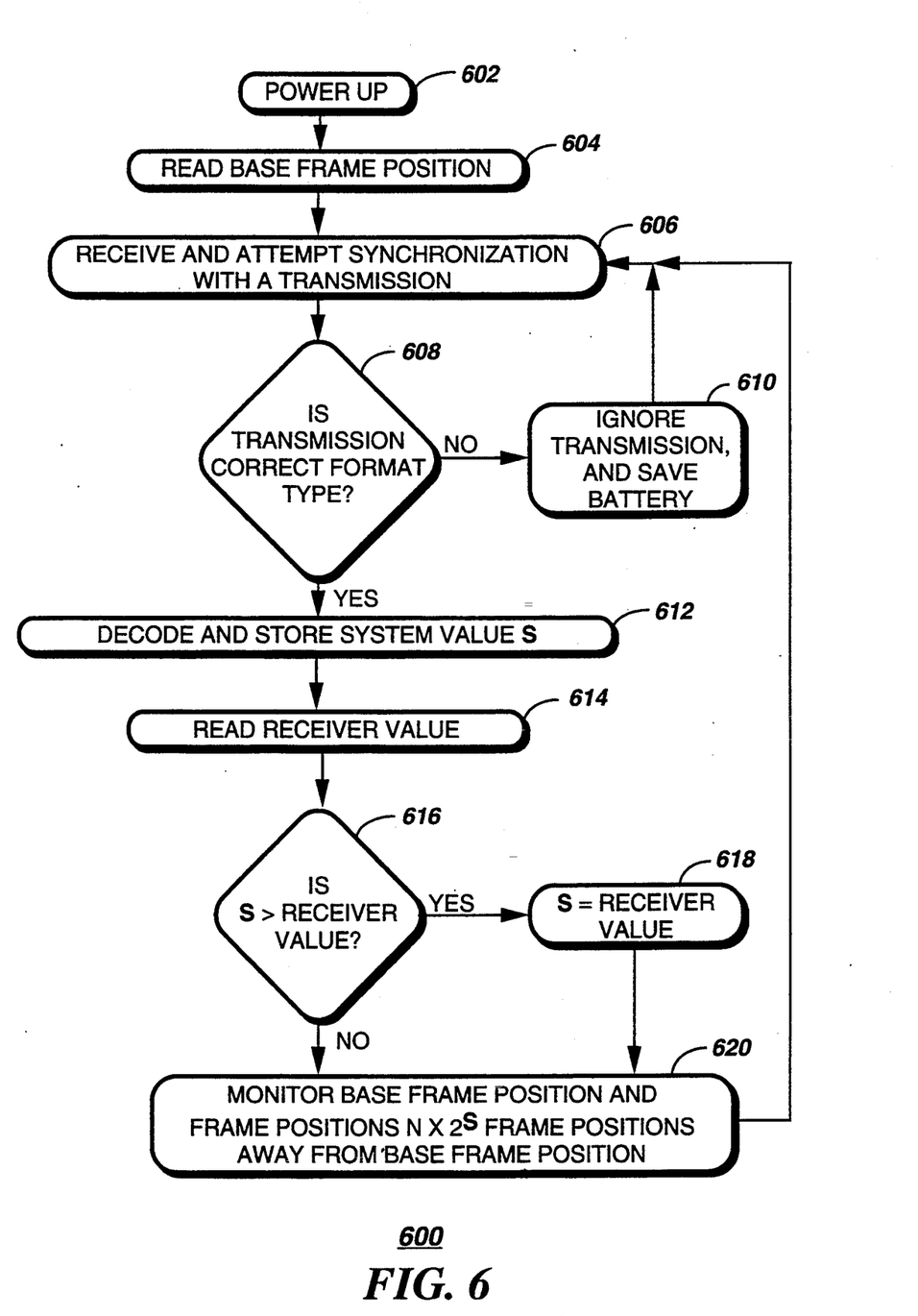
FIG. 6 is a flow chart depicting operation of the selective call receiver in accordance with the preferred embodiment of the present invention.

Referring to FIG. 6, a flow chart 600 depicting operation of the selective call receiver 110 in accordance with the preferred embodiment of the present invention begins with power up 602 of the selective call receiver 110. In response, the controller 308 accesses the ROM 310 and reads 604 the base frame position 324. Next, the selective call receiver 110 receives 606 and attempts synchronization with a transmission on the communication channel. In response, the controller 308 and the decoder 306 cooperate to determine 608 whether the transmission is compatible with the signaling format utilized by the selective call receiver 110. If not, then the transmission is ignored 610, and the controller 308 returns the selective call receiver 110 to the low-power battery-saving mode.

If, on the other hand, in step 608 the transmission is determined to be compatible, then the controller 308 controls the decoder 306 to decode 612 the system value S and then stores the system value S in the RAM 318. Next, the controller 308 reads 614 the receiver value 332. The controller 308 then checks 616 whether the system value S is larger than the receiver value 332. If so, the controller replaces 618 the system value S with the receiver value 332, and flow then moves to step 620. If, on the other hand, in step 616 the system value S is not found to be larger than the receiver value 332, then flow moves directly to step 620. In step 620 the controller 308 controls the selective call receiver 110 to monitor the base frame position 324 and other of the frame positions 402 $N \times 2^S$ frame positions away from the base frame position 324. The monitoring of the base frame position 324 and other frame positions 402 $N \times 2^S$ away from the base frame position 324 is performed, as before, in step 606.

Figure 7:
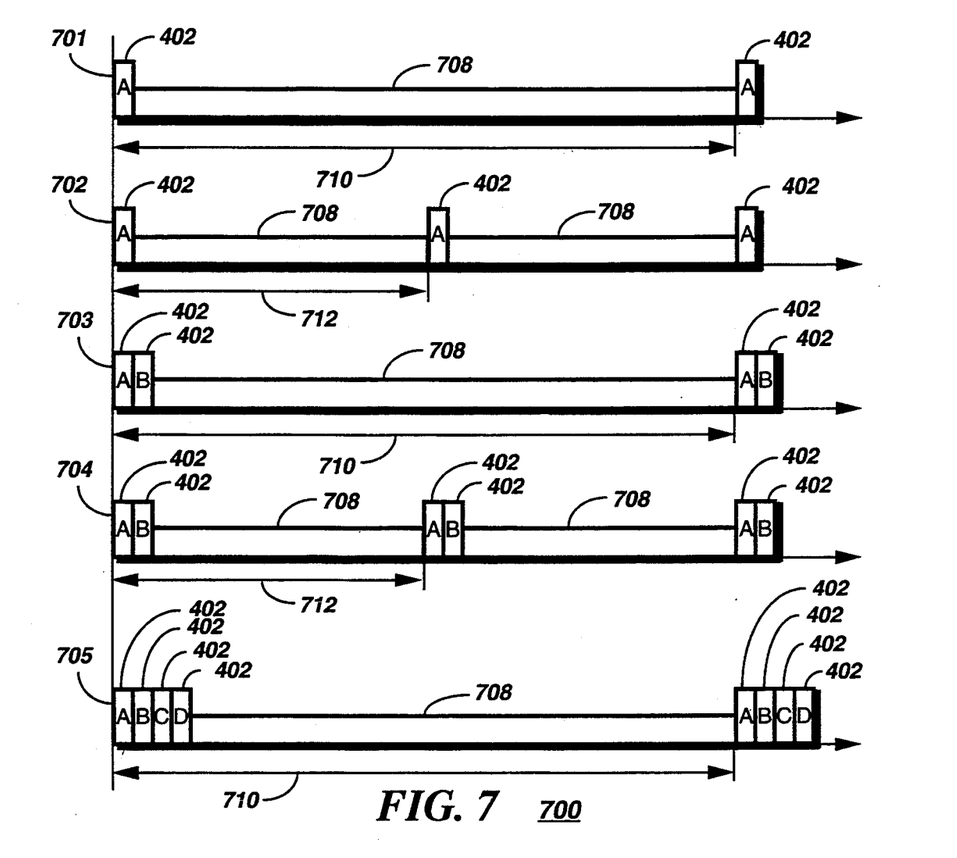
FIG. 7 is a signaling diagram depicting channel sharing in accordance with the preferred embodiment of the present invention.

Referring to FIG. 7, a signaling diagram 700 depicts channel sharing in accordance with the preferred embodiment of the present invention. The signaling diagram 700 includes first, second, third, fourth, and fifth example transmissions 701, 702, 703, 704, and 705, respectively, of the first signaling format 400 sharing a channel with a second signaling format. The first example transmission 701 repeats the first signaling format 400 at the expiration of a maximum frame interval 710 corresponding to the minimum frame repetition rate required for maintaining synchronization of the selective call receivers 110. For the first example transmission 701, the processor 204 has set the system value S to a value of zero, thereby directing the selective call receivers 110 to monitor every possible frame position 402. Thus, every selective call receiver 110 will monitor the frame position 402 of the first example transmission, regardless of the base frame position 324 of the selective call receiver 110.

Advantageously, between the transmissions of a frame in the frame position 402 of the first signaling format 400 there can be a transmission 708 of the second signaling format, e.g., the POCSAG or GSC signaling format, or both. The selective call receivers 110 will attempt to monitor other frame positions 402 falling within the period of the transmission 708 of the other signaling format, but will quickly revert to the low-power, battery-saving mode upon failing to detect compatible synchronization information within the transmission 708. Battery life in the selective call receivers 110 is thereby maintained at a high level.

In the second example transmission 702 the processor 204 has increased the frame repetition rate, resulting in a shortened frame interval 712 to accommodate more traffic in the first signaling format 400. When the shortened frame interval 712 is shortened to less than one-half of the maximum frame interval 710, i.e., when the frame rate becomes greater than twice the minimum frame rate, then the processor 204 increments the system value S to one, and controls the encoder/transmitter controller 206 to send frames in two consecutive frame positions 402 and to revert to the maximum frame interval 710, as depicted in the third example transmission 703. This action provides two advantages: a longer contiguous interval for the transmission 708 of the second signaling format, and improved battery saving for the selective call receivers 110, which utilize the first signaling format 400. The latter advantage results from setting the system value S to one, thereby causing each of the selective call receivers 110 to monitor only alternate frame positions 402.

In a similar manner, as traffic increases further, the processor 204 increases the frame rate until the transmissions are similar to the fourth example transmission 704, after which in response to a further increase in traffic the processor 204 increments the system value S to two and reverts to the maximum frame interval 710, as depicted in the fifth example transmission 705. By setting the system value S to two the processor 204 controls the selective call receivers 110 to monitor only every fourth frame position 402, thereby further improving the battery saving. The process of increasing the frame rate and then incrementing S and doubling the flames transmitted per transmission of the first signaling format 400 continues in a similar manner as traffic volume increases for the selective call receivers 110.

Thus, the present invention provides a method and apparatus that advantageously allows sharing a long-term-synchronous signaling format and a short-term-synchronous signaling format on a common communication channel without producing undesirable interaction between the two formats. The present invention allows an existing communication system to make a graceful transition from a short-term-synchronous format to the more modern, long-term-synchronous format, while also allowing immediate exploitation of the superior battery saving characteristics of the long-term-synchronous format.

What is claimed is:

1. A method of sharing first and second signaling formats on a communication channel in a communication system comprising a system controller and first and second pluralities of selective call receivers communicating in the first and second signaling formats, respectively, wherein the first signaling format is synchronous and comprises frames transmitted no less frequently than a minimum frame rate in selected ones of a plurality of predetermined frame positions, and wherein each of the first plurality of selective call receivers is preprogrammed with a base frame position corresponding to one of the plurality of predetermined frame positions, the method comprising under control of the system controller the steps of:

programming a system value stored in the first plurality of selective call receivers for defining a system battery saving interval, the programmed system value for enabling the first plurality of selective call receivers to receive communications transmitted in at least one position of the plurality of predetermined frame positions, the at least one position determined from the preprogrammed base frame position and the system value;

transmitting frames of the first signaling format utilizing at least the minimum frame rate, each transmission having a beginning and an end; and sending frames of the second signaling format during time intervals between the end of a transmission of the first signaling format and the beginning of a next transmission of the first signaling format, wherein the system value comprises a system integer S, and wherein the programming step comprises the step of controlling the system integer S for enabling the first plurality of selective call receivers to receive communications transmitted in any frame position selected from the base frame position and frame positions $N \times 2^S$ frame positions away from the base frame position, where N is any integer.

2. The method according to claim 1,
wherein ones of the first plurality of selective call receivers are preprogrammed with a receiver value for defining a receiver maximum battery saving interval for the ones of the first plurality of selective call receivers, and
wherein the ones of the plurality of selective call receivers internally replace the system value by the receiver value in response to the system value defining a system battery saving interval larger than the receiver maximum battery saving interval.

3. The method according to claim 1,
wherein the programming step comprises the step of setting the system integer S to zero for enabling the plurality of selective call receivers to receive communications transmitted in every possible frame position of the first signaling format, and
wherein the transmitting step comprises the step of encoding a single frame per transmission when S is zero.

4. The method according to claim 1,
wherein the programming step comprises the step of setting the system integer S to a value greater than zero, and
wherein the transmitting step comprises the step of encoding $2^S$ frames per transmission.

5. The method according to claim 1,
wherein the transmitting step further comprises sending the frames of the first signaling format at a frame rate faster than the minimum frame rate in response to increasing communication traffic for handling more communication traffic than can be handled at the minimum frame rate.

6. The method according to claim 5,
wherein the programming step further comprises incrementing the system integer S by a count of one in response to the transmitting step sending the frames of the first signaling format at a rate faster than twice the minimum frame rate.

7. The method according to claim 5,
wherein the programming step further comprises decrementing the system integer S by a count of one in response to average traffic per frame being less than fifty percent of frame capacity at the minimum frame rate, the system integer S being greater than zero.

8. A system controller for controlling sharing of first and second signaling formats on a communication channel in a communication system comprising the system controller and first and second pluralities of selective call receivers communicating in the first and second signaling formats, respectively, wherein the first signaling format is synchronous and comprises frames transmitted no less frequently than a minimum frame rate in selected ones of a plurality of predetermined frame positions, and wherein each of the first plurality of selective call receivers is preprogrammed with a base frame position corresponding to one of the plurality of predetermined frame positions, the system controller comprising:

a page input for receiving page requests from callers desiring to send messages to one of the first and second pluralities of selective call receivers;

a page queue coupled to the page input for storing selective call addresses and messages corresponding to the received page requests for subsequent transmission;

a processor coupled to the page queue for controlling an encoder/transmitter controller to generate a transmission of frames of the first signaling format utilizing at least the minimum frame rate, the frames comprising the selective call addresses and messages stored in the page queue, and each transmission having a beginning and an end;

the encoder/transmitter controller coupled to the processor for generating the transmission of frames of the first signaling format;

a programmer coupled to the processor for programming a system value stored in the first plurality of selective call receivers for defining a system battery saving interval, the programmed system value for enabling the first plurality of selective call receivers to receive communications transmitted in at least one position of the plurality of predetermined frame positions, the at least one position determined from the preprogrammed base frame position and the system value; and an injector coupled to the processor for controlling the encoder/transmitter controller to send frames of the second signaling format during time intervals between the end of a transmission of the first signaling format and the beginning of a next transmission of the first signaling format, wherein the system value comprises a system integer S, and wherein the programmer comprises:

a frame controller for controlling the system integer S for enabling the first plurality of selective call receivers to receive communications transmitted in any frame position selected from the base frame position and frame positions $N \times 2^S$ frame positions away from the base frame position, where N is any integer; and an encoder controller coupled to the frame controller for directing the processor to encode $2^S$ frames per transmission.

9. The system controller according to claim 8, wherein the frame controller comprises a zero-setter coupled to the encoder controller for setting the system integer S to zero for enabling the plurality of selective call receivers to receive communications transmitted in every possible frame position of the first signaling format.

10. The system controller according to claim 8, wherein the frame controller comprises a non-zero-setter coupled to the encoder controller for setting the system integer S to a value greater than zero for enabling the plurality of selective call receivers to receive communications transmitted in less than every possible frame position of the first signaling format.

11. The system controller according to claim 8, further comprising a speed controller coupled to the processor for directing the processor to send the frames of the first signaling format at a frame rate faster than the minimum frame rate in response to increasing communication traffic for handling more communication traffic than can be handled at the minimum frame rate.

12. The system controller according to claim 11, wherein the programmer further comprises an incrementer coupled to the speed controller for incrementing the system integer S by a count of one in response to the speed controller directing the processor to send the frames of the first signaling format at a rate faster than twice the minimum frame rate.

13. The system controller according to claim 11, wherein the programmer further comprises a decrementer coupled to the processor for decrementing the system integer S by a count of one in response to average traffic per frame being less than fifty percent of frame capacity at the minimum frame rate, the system integer S being greater than zero.

14. A selective call receiver operating on a first signaling format for sharing a communication channel with a plurality of selective call receivers operating on a second signaling format in a communication system comprising a system controller, wherein the first signaling format is synchronous and comprises frames transmitted no less frequently than a minimum frame rate in selected ones of a plurality of predetermined frame positions, the selective call receiver comprising:

an antenna for intercepting radio signals comprising addresses, messages, and control commands;

a receiver element coupled to the antenna for demodulating the intercepted radio signals to derive the addresses, messages, and control commands;

a decoder coupled to the receiver element for decoding the addresses;

a controller responsive to the decoder and coupled to the receiver element for processing the messages and control commands;

a first memory element coupled to the controller for storing a preprogrammed base frame position corresponding to one of the plurality of predetermined frame positions;

a second memory element coupled to the controller for storing a system value received in the control commands, the system value defining a system battery saving interval for enabling the selective call receiver to receive communications transmitted in at least one position of the plurality of predetermined frame positions, the at least one position determined from the preprogrammed base frame position and the system value;

a synchronizer coupled to the first and second memory elements and coupled to the controller for controlling the selective call receiver to receive frames of the first signaling format transmitted in the at least one position utilizing at least the minimum frame rate, each transmission having a beginning and an end; and an ignore element coupled to the synchronizer for controlling the selective call receiver to ignore transmissions sent in the second signaling format during time intervals between the end of a transmission of the first signaling format and the beginning of a next transmission of the first signaling format, wherein the system value comprises a system integer S, and wherein the selective call receiver further comprises a frame monitor for enabling the selective call receiver to receive communications transmitted in any frame position selected from the preprogrammed base frame position and frame positions $N \times 2^S$ frame positions away from the preprogrammed base frame position, where N is any integer.

15. The selective call receiver according to claim 14, further comprising:

a receiver value memory element for storing a preprogrammed receiver value for defining a receiver maximum battery saving interval for the selective call receiver, and a replacer coupled to the receiver value memory element for internally replacing the system value by the preprogrammed receiver value in response to the system value defining a system battery saving interval larger than the receiver maximum battery saving interval.

* * * * *